(12) United States Patent
O'Brien et al.

(10) Patent No.: US 10,023,500 B2
(45) Date of Patent: Jul. 17, 2018

(54) LIGHT-CURABLE CERAMIC SLURRIES WITH HYBRID BINDERS

(71) Applicant: General Electric Company, Schenectady, NY (US)

(72) Inventors: Michael Joseph O'Brien, Halfmoon, NY (US); Cathleen Ann Hoel, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/251,991

(22) Filed: Aug. 30, 2016

(65) Prior Publication Data

US 2018/0057414 A1    Mar. 1, 2018

(51) Int. Cl.
| | |
|---|---|
| *C08F 2/46* | (2006.01) |
| *C08G 61/04* | (2006.01) |
| *C04B 35/632* | (2006.01) |
| *C04B 35/10* | (2006.01) |
| *C04B 35/638* | (2006.01) |
| *C04B 35/622* | (2006.01) |
| *B28B 1/00* | (2006.01) |
| *B28B 11/24* | (2006.01) |
| *B33Y 10/00* | (2015.01) |
| *B33Y 70/00* | (2015.01) |

(52) U.S. Cl.
CPC .......... *C04B 35/6325* (2013.01); *B28B 1/001* (2013.01); *B28B 11/243* (2013.01); *B33Y 10/00* (2014.12); *B33Y 70/00* (2014.12); *C04B 35/10* (2013.01); *C04B 35/62218* (2013.01); *C04B 35/638* (2013.01); *C04B 2235/3217* (2013.01); *C04B 2235/3418* (2013.01); *C04B 2235/3463* (2013.01); *C04B 2235/483* (2013.01); *C04B 2235/661* (2013.01)

(58) Field of Classification Search
USPC .......................................... 522/71, 1; 520/1
See application file for complete search history.

(56) References Cited

U.S. PATENT DOCUMENTS

| | | | |
|---|---|---|---|
| 4,061,652 A | 12/1977 | Schroeter et al. | |
| 4,179,548 A | 12/1979 | Schroeter et al. | |
| 5,488,017 A | 1/1996 | Szweda et al. | |
| 5,496,682 A * | 3/1996 | Quadir | ................ B22F 3/1055 430/269 |
| 5,601,674 A | 2/1997 | Szweda et al. | |
| 6,117,612 A * | 9/2000 | Halloran | ............... G03F 7/0037 264/401 |
| 7,265,161 B2 | 9/2007 | Leatherdale et al. | |
| 7,790,347 B2 | 9/2010 | Leatherdale et al. | |
| 7,854,969 B2 | 12/2010 | Millard et al. | |
| 7,927,538 B2 | 4/2011 | Moszner et al. | |
| 8,106,107 B2 | 1/2012 | Napadensky | |
| 8,133,831 B2 | 3/2012 | Laubersheimer et al. | |
| 8,475,946 B1 | 7/2013 | Dion et al. | |
| 9,527,244 B2 | 12/2016 | El-Siblani | |
| 2004/0132890 A1 * | 7/2004 | Oka | ...................... C08J 9/0066 524/492 |
| 2012/0010066 A1 | 1/2012 | Fischer et al. | |

FOREIGN PATENT DOCUMENTS

| | | | | |
|---|---|---|---|---|
| WO | WO-2015068860 A1 * | 5/2015 | ............... | B28B 1/30 |
| WO | 2015068860 A1 | 5/2016 | | |

OTHER PUBLICATIONS

Greco et al, Stereolitography of ceramic suspensions, 2001, Journal of Materials Science, 36, 99-105 (Year: 2001).*

Greco, A. et al., Stereolitography of Ceramic Suspensions, Journal of Materials Science 36, 2001, pp. 99-105, Kluwer Academic Publishers.

* cited by examiner

*Primary Examiner* — Jessica Whiteley
(74) *Attorney, Agent, or Firm* — GE Global Patent Operation

(57) ABSTRACT

The subject matter disclosed herein relates generally to light-curable ceramic slurries, and more specifically, to hybrid binders for light-curable ceramic slurries. A light-curable ceramic slurry includes a hybrid binder having an organic resin component and a multi-functional reactive siloxane component that is miscible with the organic resin component. The slurry also includes a photoinitiator having a corresponding photoactivation wavelength range and ceramic particles. The slurry is cured via exposure to light in the photoactivation wavelength range of the photoinitiator such that both the organic resin component and the multi-functional reactive siloxane component of the hybrid binder polymerize.

28 Claims, 1 Drawing Sheet

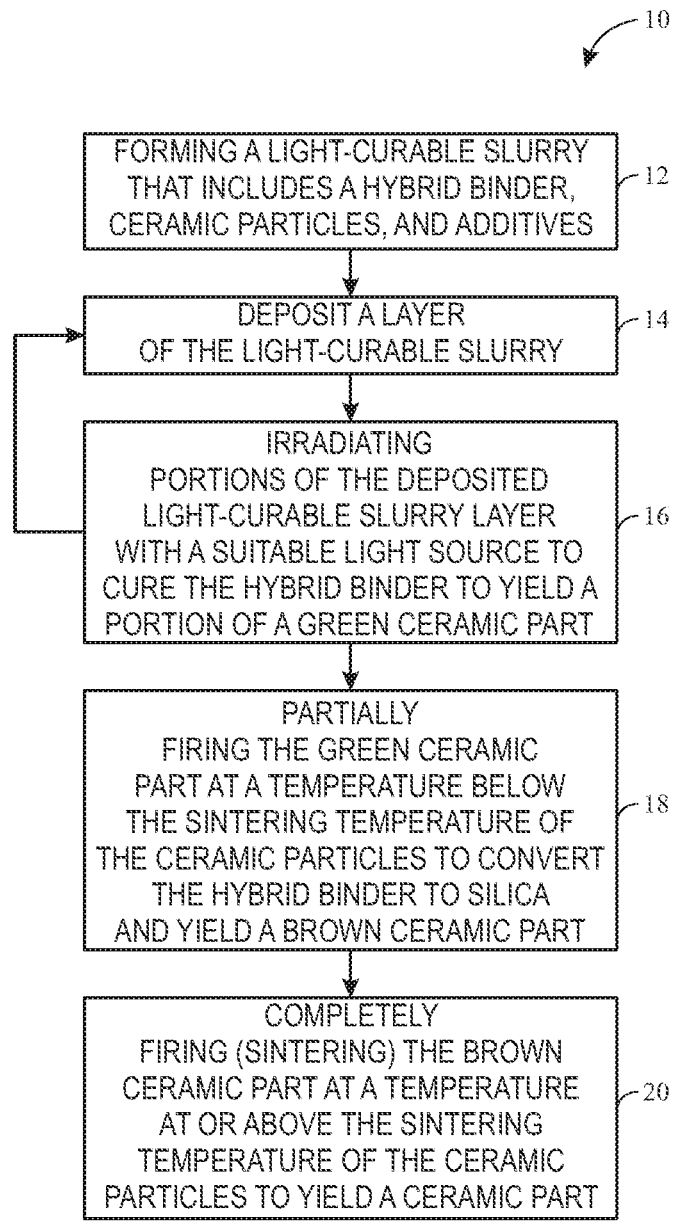

LIGHT-CURABLE CERAMIC SLURRIES WITH HYBRID BINDERS

BACKGROUND

The subject matter disclosed herein relates generally to light-curable ceramic slurries, and more specifically, to hybrid binders for light-curable ceramic slurries.

Light-curable ceramic slurries, such as ultra-violet (UV) light-curable ceramic slurries, can be used to manufacture ceramic parts that, in turn, may serve as molds for producing intricate metallic parts. Typical light-curable ceramic slurries generally include light-curable organic resins, ceramic particles, and additives (e.g., dispersants, photoinitiators, and stabilizers, etc.). These formulations are common, for example, in the dental industry. Once a light-curable ceramic slurry has been formed and deposited, a suitable light source may supply the requisite activation energy to cure (i.e., polymerize) the organic binder, such that the ceramic particles are bound (e.g., adhered, secured) to one another by the polymerized binder, yielding what is referred to as a green (i.e., unfired) ceramic part of the desired shape. Once cured, the green ceramic part may be partially fired (i.e., heated to a temperature less than the sintering temperature of the ceramic particles) to debind the part, which releases organics from the green ceramic part, yielding what is referred to as a brown ceramic part. Subsequently, the brown ceramic part is completely fired (e.g., sintered) such that the ceramic particles fuse into the final ceramic part.

When traditional organic binders are used to form a light-curable ceramic slurry, the organic binder is completely removed during the partial firing step, resulting in a brown ceramic part that is weak and susceptible to damage. Because the brown ceramic part may require some handling (e.g., transfer to another furnace, inspection, modification) prior to the final firing step, the fragility of the brown ceramic part may limit part yields. As such, it is generally desirable to improve the handling strength of brown ceramic parts in order to improve part yields and, thereby, reduce part cost.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In one embodiment, a light-curable ceramic slurry includes a hybrid binder having an organic resin component and a multi-functional reactive siloxane component that is miscible with the organic resin component. The slurry also includes a photoinitiator having a corresponding photoactivation wavelength range and ceramic particles. The slurry is cured via exposure to light in the photoactivation wavelength range of the photoinitiator such that both the organic resin component and the multi-functional reactive siloxane component of the hybrid binder polymerize.

In another embodiment, a method of manufacturing includes forming a slurry having ceramic particles and a hybrid binder, wherein the hybrid binder includes an organic resin component and a multi-functional reactive siloxane component that is miscible in the organic resin component. The method includes curing a portion of slurry by exposing the portion to light to cause the organic resin component and the multi-functional reactive siloxane component to both polymerize to form a portion of a green ceramic part and partially firing the green ceramic part to form a brown ceramic part, wherein, during partial firing, the multi-functional reactive siloxane component of the hybrid binder is substantially converted to silica disposed about the ceramic particles.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a flow diagram illustrating an embodiment of a process for manufacturing a ceramic part, in accordance with embodiments of the present approach.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Further, as used herein, a "reactive siloxane" generally refers to a molecule or polymer that includes a chain of alternating siloxane units, as well as multiple (e.g., 2, 3, 4, 5, 6, or more) reactive sites (e.g., functional groups, such as vinyl groups) available for polymerization. As such, the term "reactive siloxane" is intended to include, for example, multi-functional, short, siloxane molecules as well as longer, multi-functional silicone polymers that can polymerize under curing conditions. Accordingly, the term, "multi-functional" with respect to a reactive siloxane is intended to denote siloxane molecules or silicone polymers have more than one functional group (e.g., more than one moiety) present that is available to participate in polymerization (e.g., homopolymerization, copolymerization, or a combination thereof) of the hybrid binder under curing conditions.

Present embodiments are directed toward light-curable ceramic slurry formulations that include hybrid binders that are useful in the manufacture of ceramic parts, and which are particularly useful for stereolithography (e.g., three dimensional (3D) printing) of ceramic parts. The term "hybrid binder," as used herein, refers to a binder that includes a light-curable (e.g., UV-curable) organic resin mixed with a reactive siloxane, such as a multi-functional, short (e.g., between approximately 3 and approximately 8 siloxane (Si—O) units), cyclic siloxane, or a multi-functional, longer, straight-chain silicone polymer, capable of copolymerizing with the organic resin component. For example, in certain embodiments, the reactive siloxane may include 2, 3, 4, 5, 6, 7, 8, or more functional groups (e.g., vinyl groups) capable of polymerizing (e.g., copolymerizing or homopolymerizing) under the curing conditions. While the organic resin portion of the binder decomposes and volatilizes during partial firing, the siloxane portion is converted to silica that is disposed about (e.g., between, around) the ceramic particles to enhance the handling strength of the brown ceramic part relative to similar parts made with non-hybrid binders (e.g., containing organic resin alone). Additionally, the amount of silica formed by the disclosed hybrid binders is surprisingly high, enabling char yields that can be greater than approximately 80% of the theoretical maximum char yield for a given reactive siloxane. As used herein, "char yield" refers to the percentage of weight remaining after firing is complete, which is indicative of the amount of silica formed during firing.

As mentioned, in certain embodiments, the presently disclosed hybrid binder may be useful for 3D printing applications, such as stereolithography. For example, in certain embodiments, a 3D printing application may begin with a layer of the disclosed slurry (e.g., microns to millimeters thick), including the hybrid binder, being deposited onto a surface. The surface may be, for example, a platform or stage of the 3D printer or may be the surface of a previously cured portion of a part being printed. Once the layer has been deposited, it may be selectively irradiated with light having a suitable wavelength (e.g., UV, visible) to initiate polymerization of the binder and selectively cure and solidify desired regions of the layer to form (e.g., define) a layer of the green ceramic part. For example, a laser having suitable optical characteristics (e.g., a UV laser) may be scanned over the deposited layer of slurry and selectively activated at different times to cure regions of the layer, based on instruction from a controller, to form the layer of the green ceramic part. In other embodiments, other sources of activation energy may be used (e.g., UV lamp and a photomask). By specific example, in certain embodiments, the deposited layer of slurry may be cured using a digital light processing (DLP) system that utilizes a microelectromechanical mirror array to simultaneously direct beams of light from a light source (e.g., a light emitting diode (LED) lamp) to particular portions of the deposited slurry layer.

Subsequently, another layer of the slurry is deposited over the previous, the new layer is selectively cured, and the layer-by-layer process is repeated until the desired structure of the green ceramic part is achieved. The uncured regions of each layer may be rinsed away using an organic solvent applied to each layer after curing and/or after the desired structure of the green ceramic part is achieved. As discussed above, the green ceramic part may be partially fired to achieve a brown ceramic part, and then fully fired to achieve the final ceramic part. It may be appreciated that stereolithography and other 3D printing techniques enable the production of ceramic parts having fine features that are not readily achieved using other manufacturing techniques. Further, the ceramic parts manufactured in this way may themselves be useful as sacrificial molds used in the manufacture of complex metal parts (e.g., components of gas turbine engines, jet engines, rocket engines).

Certain features of the disclosed hybrid binders are desirable for the manufacture of ceramic parts. For example, it is presently recognized that it is generally desirable for the disclosed reactive siloxanes to be miscible with (e.g., soluble in) the organic resin of the hybrid binder prior to curing. Also, it is presently recognized that it is generally desirable for certain reactive siloxanes that exclusively copolymerize with a particular organic resin to remain substantially miscible with (e.g., soluble in) the organic resin until the curing process is substantially complete. It may be appreciated to those of skill in the art that many reactive siloxanes are not miscible with (e.g., soluble in) the typical organic monomers (e.g., acrylates, epoxies, vinyl ethers) used as organic resins in traditional binders. Further, as discussed below, it is also presently recognized that, for embodiments in which the disclosed reactive siloxane is capable of homopolymerization when used with a particular organic resin, the reactive siloxane is generally miscible with (e.g., soluble in) the organic resin before curing, but may separate into different phases at some point during the curing process. In other words, for reactive siloxanes that are capable of homopolymerization when used with a particular organic resin, the reactive siloxane and the organic resin portions of the hybrid binder can independently cure (e.g., in separate phases) resulting in interpenetrating homopolymer networks. However, it may be noted that certain reactive siloxanes may be capable of both homopolymerization and copolymerization, depending on the nature of the organic resin. For example, a methacrylated silicone resin can both homopolymerize and copolymerize with acrylate-based organic resin monomers, but can only homopolymerize when formulated with an epoxy-based, cationically curable organic resin monomer.

In certain embodiments, the reactive siloxane component of the disclosed hybrid binder may include one or more of: tetravinyltetramethyl cyclotetrasiloxane ($D_4^{Vi}$), tetrakis(vinyldimethylsiloxy)silane ($M_4^{Vi}Q$), vinylmethoxysiloxane homopolymer (ViOMe, available as part number VMM-010 from Gelest of Morrisville, Pa.), vinylmethylsiloxane cyclics ($D_x^{Vi}$ cyclics, available as part number VMS-005 from Gelest), mixed linear and cyclic siloxanes from the hydrolysis of mercaptopropylmethyldimethoxysilane ($D_x'$), and methacrylate functional silicone resins. It should be noted that, in certain embodiments, the reactive siloxane component (e.g., $D_4^{Vi}$) may be capable of exclusively copolymerizing with the monomer of the organic resin (e.g., may be incapable of homopolymerization), while other monomers (e.g., methacrylate functional silicone resins) may be capable of both co-polymerizing and homopolymerizing. As discussed below, despite the relatively uniform dispersion of the disclosed reactive siloxane within the cured binder, it is presently recognized that a substantial portion (e.g., greater than approximately 50%, greater than approximately 60%, greater than approximately 70%, or greater than approximately 80%, or more) of the reactive siloxane present in the disclosed hybrid binder is believed to be converted to silica during the firing step, and this silica dramatically improves adhesion between the ceramic particles, increasing the strength and yield of the brown ceramic part.

In certain embodiments, the organic resin component of the hybrid binder may include one or more of: acrylates, epoxies, oxetanes, vinyl ethers, thiols, and combinations thereof. As such, it may be appreciated that the disclosed organic resin may, in different embodiments, involve different curing mechanisms. For example, acrylates and thiols undergo a free radical cure, epoxies and oxetanes undergo a cationic cure, and vinyl ethers can undergo both free radial and cationic curing. In certain embodiments, the organic resin of the hybrid binder may include an acrylate, such as, for example, trimethylolpropane ethoxylate triacrylate, trimethylolpropane propoxylate triacrylate (TMPPTA), tricyclodecane dimethanol diacrylate (TCDDMDA), isobornyl acrylate (IBOA), hexanediol diacrylate (HDDA), diurethane dimethacrylate, or poly(propyleneglycol) dimethacrylate, acrylated polyurethanes, acrylated polyesters, or combinations thereof. In certain embodiments, the organic resin of the hybrid binder may include an epoxy or oxetane, such as, for example, 3,4-epoxycyclohexylmethyl 3,4-epoxycyclohexanecarboxylate, or 3-ethyl-3-oxetanemethanol, or combinations thereof. In certain embodiments, the organic resin of the hybrid binder may include a thiol, such as, for example, trimethylolpropane tris(3-mercaptoproprionate). In certain embodiments, the organic resin of the hybrid binder may include a vinyl ether, such as, for example, cyclohexanedimethanol divinyl ether.

As set forth above, the reactive siloxane and the organic resin components of the hybrid binder are generally miscible with each other in the ceramic slurry. Further, as mentioned, in certain embodiments, the reactive siloxane remains substantially miscible (e.g., soluble) in the monomers (or mixture of monomers) of the organic resin throughout curing. Additionally, in certain embodiments, the hybrid binder may include approximately equal parts of the organic resin component and the reactive siloxane component, while in other embodiments, the hybrid binder may have an organic resin to reactive siloxane ratio of approximately 2:1, approximately 3:1, approximately 4:1, or approximately 5:1 by weight. As discussed, the organic resin portion of the hybrid binder is lost (e.g., decomposed, volatilized) during a partial firing step after curing, and is no longer present in the final ceramic part.

The hybrid binder is generally mixed with one or more additives and ceramic particles to form a light-curable resin. For example, in certain embodiments, the additives of the light-curable resin may include dispersants and/or stabilizers. For example, dispersants of the light-curable resin may include polyethers (e.g., poly(ethylene oxide) or poly(propylene oxide)), or other suitable long-chain molecules having end functionality capable of interacting with the ceramic particles. By specific example, in certain embodiments, dispersants may include Hypermer™ KD dispersants (e.g., KD2, KD25), Zephrym™ ColorFX dispersants available from Croda International Plc, East Yorkshire, United Kingdom, or Triton X-100 available from BASF, Ludwigshafen, Germany. It is presently recognized that, in certain embodiments, the disclosed hybrid binder may have suitable properties to act as a dispersant, enabling the manufacture of a slurry that is substantially-free from other dispersants. Stabilizers may include any suitable molecule capable of reacting with a reactive species in the slurry to block an undesirable side reaction from occurring (e.g., polymerization of the hybrid binder before exposure to the activation source). For example, in certain embodiments, the stabilizer may include t-butylcatechol, hydroquinone monomethyl ether (MEHQ), butylated hydroxytoluene (BHT), or combinations thereof.

The disclosed light-curable resin generally includes at least one photoinitiator. The photoinitiator may include any suitable structure capable of absorbing light (e.g., UV, visible light) emitted by the activation energy source and, in response, promoting the copolymerization of the reactive siloxane and organic resin components of the hybrid binder. For example, in certain embodiments, the photoinitiator may be or include: 2-hydroxy-2-methylpropiophenone (HMPP); phenyl bis(2,4,6-trimethylbenzoyl) phosphine oxide (PBT-MBPO) (e.g., IRGACUR® 819); 2-hydroxy-2-methyl-1-phenyl-1-propanone (e.g., Darocur® 1173); diphenyl (2,4,6-trimethylbenzoyl) phospine oxide (e.g., Darocur® TPO); or 1-hydroxycyclohexyl phenyl ketone (e.g., IRGACUR® 184) or other suitable photoinitiators available from BASF, Ludwigshafen, Germany. In certain embodiments, a photosensitizer and/or photoacid generator may be used in conjunction with the photoinitiator to facilitate curing of the slurry. For example, in certain embodiments, the slurry may include 4-benzoyl-4'methyl-diphenyl sulfide, isopropylthioxanthone, or 9,10-diethoxyanthracene as a photosensitizer. In certain embodiments, the slurry may include one or more diaryliodonium and triarylsulfonium salts, such as, (p-methylphenyl)iodonium tetrakis(pentafluorophenyl) borate, or sulfonium salts UVI-6976 or UVI-6990 (available from Dow Chemical, Midland, Mich., U.S.A.) as a photoacid generator. In certain embodiments, the slurry may include one or more of Omnicat 432 and 550 (available from IGM Resins, Waalwijk, The Netherlands), PAG 290 (available from BASF), SL-6992 (available from Esstech, Inc., Essington, Pa., U.S.A.), or iodonium salts IRGACURE® 250 (available from BASF), Omnicat 440 (available from IGM Resins), or UV9380C (Momentive Performance Materials, Waterford, N.Y., U.S.A.) as a photoacid generator.

Ceramic particles (also referred to as ceramic fillers) are generally mixed with the light-curable resin to form the light-curable slurry. The ceramic particles may include any suitable ceramic particles, including, but not limited to, ceramic particles of: silica, alumina, zircon, zirconia, sodium carbonates, calcium oxide, boron trioxide, yttrium oxide, yttrium aluminate, magnesium oxide, calcium carbonate, iron oxide, or ground glasses, or combinations thereof. In certain embodiments, ceramic particles of different sizes (e.g., different $d_{50}$ values) may be combined within the slurry. For example, in certain embodiments, the slurry may include mostly (e.g., approximately 55%) larger alumina particles (e.g., having a $d_{50}$ of approximately 22 micrometers (μm)) and some (e.g., approximately 45%) smaller alumina particles (e.g., having a $d_{50}$ of approximately 1.5 μm) in order to encourage tight packing of the ceramic particles within the ceramic part.

It may be appreciated that certain embodiments of the disclosed slurry formulation may only include a single additive (e.g., a photoinitiator), two additives (e.g., a photoinitiator and a dispersant), or several additives. It may be further appreciated that, at least partially due to the miscibility of the organic resin and reactive siloxane components of the hybrid binder, in certain embodiments, the disclosed slurry may advantageously be substantially free of organic solvents. Since solvents added to the slurry to improve solubility/miscibility also contribute additional organic content that should be removed from the green ceramic part during partial firing, the use of solvents in the slurry can increase debind shrinkage and reduce the handling strength of the resulting brown ceramic part. Additionally, solvents undesirably increase the cost and the environmental impact of the process. As such, embodiments of the present approach may improve the handling strength of brown ceramic parts while also reducing cost and environmental impact.

Embodiments of the present technique can produce a green ceramic part having either a copolymerized binder, a binder that includes an interpenetrating network two homopolymers, or a mixture thereof. That is, for embodiments of reactive siloxanes (e.g., methacrylate functional silicone resins) that are capable of homopolymerizing when cured with a particular organic resin, the organic resin portion and the siloxane portion of the hybrid binder begin in the same phase within the ceramic slurry, and subsequently independently cure (e.g., in separate phases) to produce interpenetrating networks of the two polymers. However, for embodiments of reactive siloxanes that exclusively copolymerize (e.g., $D_4^{Vi}$, $M_4^{Vi}Q$) when cured with a particular organic resin, the reactive siloxane component remains substantially miscible with (e.g., soluble in) the organic resin portion as a single phase throughout curing. It may be appreciated that this miscibility is especially important for embodiments of reactive siloxanes that are volatile, to ensure that the reactive siloxane is afforded an opportunity to react and cure before being volatilized.

As illustrated in Table 1 below, potential combinations of reactive siloxanes and organic resins were evaluated for different embodiments of the hybrid binder. For the model experiments represented in Table 1, approximately 20 wt % of copolymerizable reactive siloxanes were mixed with acrylate monomers as the organic resin to determine compatibility. If a homogeneous blend was obtained, a photoinitiator was added and small samples of the blend were UV cured for 15 seconds using an Omnicure 2000 light source. The appearance of the cured films was then evaluated to look for phase separation. Finally, thermal gravimetric analysis (TGA) experiments were conducted using a Perkin Elmer DSC7 instrument. These were done in air by heating from room temperature to 800° C. at a rate of 10° C./min. The amount of weight loss up to 300° C. was used to gauge relative cure, wherein lower weight loss (presumably due to less evaporation of unreacted monomers/reactive siloxanes) is indicative of a better cure. The char yield was also determined after continuing heating up to 800° C.

For the char yield values indicated in Table 1, higher numbers indicate more efficient conversion of the reactive siloxane component of the hybrid binder to silica. The data presented in Table 1 indicates that char yield generally is higher in formulations with better cure. It also indicates that cured samples that remain clear during the cure process tend to give higher char yields. It may be appreciated that different reactive siloxane components have different theoretical char yields depending on the weight percentage of silicon that each includes. It should be noted that the many of the char yields in Table 1 are more than 80% (e.g., greater than approximately 50%, greater than approximately 60%, greater than approximately 70%, or greater than approximately 80%, or more) of the theoretical values for these reactive siloxane components at 20 wt % loading in the blends. In addition to the information listed in Table 1, certain reactive siloxanes, such as linear vinylmethylsiloxane homopolymer (VMS-T11, available from Gelest), were determined to be unsuitable for the present technique after failing to form homogenous mixtures as indicated above with TCDDMDA, TMPPTA, or HDDA. It may be appreciated that the char percentage of theoretical value listed in Table 1 exceeds 100% for a couple of embodiments, indicating an incomplete conversion of the hybrid binder to silica during the TGA heating and that more time or greater temperature heat treatment is required for complete conversion.

TABLE 1

Screening data for compatible reactive siloxanes and acrylate organic resins for embodiments of the disclosed hybrid binder.

| Siloxane | Organic Resin | Photoinitiator | Appearance after cure | Wt Loss <300° C. (%) | Char Yield (%) | Char % of Theoretical |
|---|---|---|---|---|---|---|
| $D_4^{Vi}$ | TCDDMDA | PBTMBPO | Clear | 1.56 | 11.69 | 84 |
| $D_4^{Vi}$ | TMPPTA | PBTMBPO | Clear | 2.13 | 11.65 | 84 |
| $M_4^{Vi}Q$ | TCDDMDA | HMPP | Hazy | 9.06 | 3.46 | 25 |
| $M_4^{Vi}Q$ | HDDA | HMPP | Gross phase separation | NT | NT | NT |
| $M_4^{Vi}Q$ | TMPPTA | HMPP | Hazy | 10.68 | 5.49 | 40 |
| $M_4^{Vi}Q$ | IBOA | HMPP | Clear | 9.22 | 7.9 | 57 |
| Dx' | TCDDMDA | HMPP | Clear | 3.69 | 9.17 | 102 |
| $Dx^{Vi}$ cyclics | TCDDMDA | HMPP | Clear | 4.55 | 9.92 | 71 |
| ViOMe | TCDDMDA | HMPP | Clear | 2.95 | 13.93 | 118 |

NT indicates "not tested."

As mentioned above, in certain embodiments, the disclosed reactive siloxane component may exclusively copolymerize with the organic resin component of the hybrid binder (as opposed to also undergoing homopolymerization) under the curing conditions. For example, the exclusive copolymerization of $D_4^{Vi}$ was confirmed using model reactions in which certain samples included $D_4^{Vi}$ and a photoinitiator (e.g., IRGACUR® 819), while other samples include $D_4^{Vi}$, the photoinitiator, and an organic resin component (e.g., IBOA). Thin films of both sets of samples were prepared and exposed to a suitable activation light source (e.g., Omicure Series 2000 UV light source) for 15 seconds. After light exposure, the samples that lacked the organic resin component remained a low-viscosity liquid, and nuclear magnetic resonance (NMR) analysis confirmed that no reaction (i.e., no homopolymerization) had occurred.

With this in mind, is surprising that such a high char yields were observed the disclosed hybrid binders. That is, as discussed above, certain disclosed reactive siloxane components (e.g., $D_4^{Vi}$) did not demonstrate any propensity towards homopolymerization under the curing conditions. Therefore, it is believed that the structure produced in the cured hybrid binder (e.g., $D_4^{Vi}$/photocurable acrylate blend) would be relatively isolated siloxane (e.g., cyclotetrasiloxane) units surrounded by organic (e.g., polyacrylate) chains. As discussed above, the organic portion of the hybrid binder is removed by thermal decomposition and vaporization during partial firing, while the siloxane units are converted to silica. Yet, despite these siloxane units being relatively isolated, as noted in the examples, silica formation upon firing is unexpectedly efficient. For example, as set forth above, in certain embodiments, the disclosed hybrid binders surprisingly demonstrated char yields indicating more than approximately 80% of the siloxane content is converted to silica.

With the foregoing in mind, FIG. 1 is a flow diagram illustrating an embodiment of a process 10 for manufacturing a ceramic part using a light-curable slurry having a hybrid binder, in accordance with embodiments of the present approach. The illustrated process 10 begins with forming (block 12) a light-curable slurry that includes the hybrid binder, ceramic particles, and additives (e.g., photoinitiators, dispersants, stabilizers). It may be appreciated that the ingredients may be mixed in different orders. For example, in certain embodiments, first the components of the hybrid binder may be added, then the additives may be added to form a light-curable resin, and then ceramic particles may be added to form the light-curable slurry. In certain embodiments, the slurry may be mechanically mixed, mixed by hand, or a combination thereof, to achieve the desired consistency.

Next, the illustrated process 10 continues with depositing (block 12) a layer of the light-curable slurry. As set forth above, in certain embodiments, the layer of the light-curable slurry may be deposited on a platform of a 3D printer or on top of a previously cured layer of the part. The deposited light-curable slurry layer may range in thickness from a few microns to several millimeters. In certain embodiments, the thickness of the deposited slurry layer may be less than the penetration depth of the light source used to cure the slurry to ensure that the entire layer completely cures upon irradiation.

The illustrated process 10 continues with irradiating (block 16) portions of the deposited layer of light-curable slurry with a light source suitable to cure the hybrid binder to yield a portion (e.g., a layer) of a green ceramic part. For example, in certain embodiments, the light source (e.g., laser, lamp, LED) is capable of selectively providing electromagnetic activation energy in the UV range (e.g., wavelength less than or equal to 380 nanometers (nm)) or in the visible range (e.g., wavelength between approximately 380 nm and 700 nm), for example, between approximately 250 nm and 500 nm. As indicated by the arrow 17, the steps represented by blocks 14 and 16 may be repeatedly performed to build up an entire green ceramic part in a layer-by-layer manner. In certain embodiments, a solvent may be applied to the green ceramic part (e.g., between layer deposition, after printing of the green ceramic part is complete) to remove any uncured slurry from the cured portions of the green ceramic part.

The illustrated process 10 continues with partially firing (debinding) (block 18) the green ceramic part at a temperature below the sintering temperature of the ceramic particles to convert the hybrid binder to silica and yield a brown ceramic part. It may be appreciated that the temperature for the partial firing step of block 18 should be sufficiently high (e.g., greater than approximately 500° C., between approximately 500° C. and approximately 1000° C., between approximately 500° C. and approximately 1200° C.) to ensure that the organic portion (e.g., the hydrocarbon content, the carbon and hydrogen content) of the binder decomposes and is released from the green ceramic part, and to ensure that a substantial number of the reactive siloxane species are converted to silica within the green ceramic part. By specific example, in certain embodiments, the green ceramic part may first be heated to a maximum temperature (e.g., 1200° C.) at a slow ramp over the course of 2 days, and then holding the maximum temperature for approximately 30 minutes.

It may be appreciated that, while the temperature of the partial firing (debinding) of block 18 is generally below the sintering temperature of the particular ceramic particles used to manufacture a green ceramic part, in certain embodiments, a limited amount of sintering may occur during this partial firing step, which may further increase the strength of the brown ceramic part. However, it may be appreciated that the limited sintering occurring in the partial firing temperature range represents only a small amount of fusion between the ceramic particle surfaces. As such, the silica produced from the partial firing of the hybrid binder and the limited amount of sintering that occurs during the partial firing step may both contribute to the observed improvement in handling strength of the brown ceramic part, in certain embodiments. Additionally, as discussed in the examples below, the green ceramic part generally experiences shrinkage (i.e., debind shrinkage) during the partial firing step of block 18 and, in general, less debind shrinkage is generally beneficial to the quality and yield of the final ceramic part.

The illustrated process 20 continues with completely firing (sintering) (block 20) the brown ceramic part at a temperature at or above the sintering temperature of the ceramic particles to yield the final ceramic part. During this sintering step, the brown ceramic part is heated to a temperature in which the ceramic particles fuse into a substantially continuous ceramic part. For example, for embodiments that utilize silica ceramic particles, the complete firing of block 20 may involve heating to temperatures greater than approximately 1200° C. (e.g., between approximately 1200° C. and 1600° C.) for between approximately 2 and 24 hours. For embodiments that utilize alumina ceramic particles, the complete firing of block 20 may involve heating to temperatures of at least approximately 1600° C. (e.g., between approximately 1600° C. and 2000° C.) for between approximately 2 and 24 hours. As discussed in the examples below, the brown ceramic part generally experiences shrinkage (i.e., sintering shrinkage) during the complete firing step of block 20 and, in general, less sintering shrinkage is generally beneficial to the quality and yield of the ceramic part.

In certain embodiments in which certain ceramic particles other than silica are used, the silica formed by the oxidative decomposition of the hybrid binder during the partial firing of block 18 can react with the ceramic particles to form silicates between ceramic particles, which can further increase the strength and/or reduce sintering shrinkage of the ceramic part. For example, such ceramic particles include alumina, yttrium oxide, zirconia, sodium carbonates, calcium oxide, magnesium oxide, and others. By specific example, in certain embodiments, in which alumina ceramic particles are used, the silica present in the brown ceramic part from the partial firing of the siloxane portion of the hybrid binder (in block 18) may react with the alumina ceramic particles at high temperature (e.g., 1600° C.) to form aluminosilicate (e.g., mullite) between ceramic particle boundaries during the sintering step of block 20. It may be appreciated that the formation of such silicates represents an example of reaction bonding, which further increases the handling strength of the final ceramic part. It may further be appreciated that, in certain embodiments, the firing of blocks 18 and 20 could be combined into a single firing step, in which the green ceramic part first undergoes debinding and, subsequently sintering, without necessarily being handled in between. For such embodiments, it may be appreciated that, while the improvement in the brown ceramic strength may be less relevant, embodiments of the presently disclosed hybrid binder may still enable improvements in terms of improved strength and/or reduced shrinkage in the final ceramic part.

Examples 1-9

For Examples 1-9 set forth below, the disclosed light-curable slurry is mixed (e.g., by hand, and then with a Flack-Tek speed mixer). A multi-layered 5 cm×5 cm plate was prepared on a glass slide by coating each layer with a doctor blade, then curing the layer for 15 seconds with UV light (e.g., Omni cure 2000 UV light), followed by coating the next layer. A total of between 5 and 10 layers were cured resulting in a net thickness of between 0.5 mm and 1.5 mm. Example 1 set forth below describes a slurry that does not include a reactive siloxane component (i.e., does not include a hybrid binder) and is provided for comparative purposes.

Example 1. Comparison Alumina Slurry (Lacking a Reactive Siloxane)

First a resin blend was prepared by mixing 23 grams (g) of trimethylolpropane ethoxylate triacrylate, 10 g of tricyclodecane dimethanol diacrylate, 17 g of diurethane dimethacrylate, 0.05 g t-butylcatechol, and 1 g of phenyl bis(2,4,6-trimethylbenzoyl) phosphine oxide. Next, 38.05 g of this blend was mixed with 129.23 g of alumina with a 22 µm $d_{50}$, 32.42 g of alumina with a 1.5 µm $d_{50}$, and 0.42 g of Hypermer™ KD-2 dispersant.

Example 2

A resin blend was prepared by mixing the following: 20 g of trimethylolpropane propoxylate triacrylate, 20 g tetravinyltetramethylcyclotetrasiloxane, 20 g of tricyclodecane dimethanol diacrylate, 40 g of diurethane dimethacrylate, 0.1 g t-butylcatechol, and 2 g of phenyl bis(2,4,6-trimethylbenzoyl) phosphine oxide. Next, a slurry was prepared by mixing 38 g of the resin blend with 129.28 g of alumina with a 22 µm $d_{50}$, 32.30 g of alumina with a 1.5 µm $d_{50}$, and 0.43 g of Hypermer™ KD-2 dispersant. The alumina powders were the same as those used in Example 1.

Example 3

A resin blend was prepared by mixing the following: 20 g of trimethylolpropane propoxylate triacrylate, 19 g tetravinyltetramethylcyclotetrasiloxane, 40 g of tricyclodecane dimethanol diacrylate, 21 g of poly(propyleneglycol) dimethacrylate, 0.1 g t-butylcatechol, and 2 g of phenyl bis(2,4,6-trimethylbenzoyl) phosphine oxide. Next, a slurry was prepared by mixing 35.12 g of the resin blend with 131.58 g of alumina with a 22 µm $d_{50}$, 32.92 g of alumina with a 1.5 nm $d_{50}$, and 0.45 g of Hypermer™ KD-25 dispersant. The alumina powders were the same as those used in Example 1.

Example 4

Another slurry was prepared by mixing 35.10 g of the resin blend from Example 3 with 131.62 g of alumina with a 22 µm $d_{50}$, 32.93 g of alumina with a 1.5 µm $d_{50}$, 0.30 g of Hypermer™ KD-25 dispersant, and 0.15 g of Zephrym™ Color FX dispersant. The alumina powders were the same as those used in Example 1.

Example 5

A. Preparation of Methacrylated Silicone Resin A 17 g of a silicone resin (e.g., SR355 available from Momentive Performance Materials, of Waterford, N.Y.) was dissolved in 40 mL chloroform. Next, 7.6 g of 3-methacryloxypropyldimethylmethoxysilane was added followed by a blend of 0.7 g formic acid, 10 mL chloroform, and 0.5 g dibutylamine. The result was heated to reflux in air until nuclear magnetic resonance (NMR) showed the reaction to be complete. The volatiles were then stripped under vacuum. The resulting residue was dissolved in fresh chloroform, washed three times with deionized water, and washed once with saturated sodium chloride. After drying over anhydrous sodium sulfate, the solvent was removed on a rotary evaporator yielding 24 g of product as a viscous oil.

B. Alumina Slurry

A resin blend was prepared by mixing 10 g of the methacrylated silicone resin A (described above), 10 g of trimethylolpropane propoxylate triacrylate, 10 g of tricyclodecane dimethanol diacrylate, 20 g of diurethane dimethacrylate, 0.05 g t-butylcatechol, and 1 g of phenyl bis(2,4,6-trimethylbenzoyl) phosphine oxide. Next, a slurry was prepared by mixing 38.07 g of this resin blend with 129.24 g of alumina with a 22 µm $d_{50}$, 32.37 g of alumina with a 1.5 µm $d_{50}$, and 0.42 g of Hypermer™ KD-2 dispersant. The alumina powders were the same as those used in Example 1.

Example 6

A. Preparation of Methacrylated Silicone Resin B 25 g of a silicone resin (e.g., SR355 available from Momentive Performance Materials) was dissolved in 40 mL chloroform along with 0.03 t-butylcatechol. Next, 8.8 g of 3-methacryloxypropyldimethylmethoxysilane was added followed by a blend of 1 g formic acid, 25 mL chloroform and 0.74 g dibutylamine. The result was heated to reflux overnight and then allowed to cool to room temperature. After washing three times with deionized water and once with saturated sodium chloride, the solution was dried over anhydrous sodium sulfate. The volatiles were then removed on a rotary evaporator to give 37.4 g of product as a viscous oil.

B. Alumina Slurry

A resin blend was prepared by mixing 28 g of methacrylated silicone resin B (described above), 33 g of trimethylolpropane propoxylate triacrylate, 14 g of tricyclodecane dimethanol diacrylate, 25 g of diurethane dimethacrylate, 0.1 g t-butylcatechol, and 2 g of phenyl bis(2,4,6-trimethylbenzoyl) phosphine oxide. Next, a slurry was prepared by mixing 38.07 g of this resin blend with 129.24 g of alumina with a 22 µm $d_{50}$, 32.37 g of alumina with a 1.5 µm $d_{50}$, and 0.42 g of a Hypermer™ KD-2 dispersant. The alumina powders were the same as those used in Example 1.

Example 7

A resin blend was prepared by mixing the following: 12.5 g of trimethylolpropane propoxylate triacrylate, 10 g vinylmethoxysiloxane homopolymer, 15 g of tricyclodecane dimethanol diacrylate, 12.5 g of diurethane dimethacrylate, 0.05 g t-butylcatechol, and 1 g of phenyl bis(2,4,6-trimethylbenzoyl) phosphine oxide. Next, a slurry was prepared by mixing 38.03 g of the resin blend with 129.25 g of alumina with a 22 μm $d_{50}$, 32.30 g of alumina with a 1.5 μm $d_{50}$, and 0.41 g of Hypermer™ KD-25 dispersant. The alumina powders were the same as those used in Example 1.

Partially Firing and Sintering Examples 1-7

Cured samples of the alumina slurries of Examples 1-7 above were cut into bars to measure firing shrinkage. For each cured plate, the outer 1 centimeter (cm) perimeter was removed. Six bars were cut out of the central portion of the plate using a wet diamond saw. Each bar was between approximately 15 mm and approximately 20 mm long and between approximately 1.5 mm and approximately 2.5 mm wide. The thickness of each bar was defined by the thickness of the cured plate, which was between approximately 0.5 mm and approximately 1.5 mm. The lengths of all six bars were measured with calipers using 0.01 mm precision before and after firing to determine the net linear firing shrinkage. During partial firing (debinding), the cured bars were immersed in fine alumina sand and slowly fired over 2 days up to 1200° C. with a 30 minute soak (i.e., holding temperature constant at 1200° C. for 30 minutes) to remove the binder. The shrinkage measured after the debinding step is referred to herein as the debind shrinkage. Most of the shrinkage at the debind step is due to the oxidative decomposition of the binder between approximately 200° C. and approximately 400° C., but some minor sintering shrinkage from between 1000° C. and 1200° C. may also be included. In certain embodiments, the samples may be fired up to 1200° C. during partial firing to slightly sinter so that they can be sufficiently strong to be handled to measure the net length. As indicated in Table 2, the average debind shrinkage of the cured organic resins during debinding is similar to the debind shrinkage of Example 1, which does not include a hybrid binder of the present technique. It may be noted that certain examples (e.g., Examples 2 and 6) actually demonstrate a lower debind shrinkage than Example 1, which does not include a hybrid binder.

TABLE 2

Average debind and sintering shrinkage for examples 1-7, in which example 1 does not include the disclosed hybrid binder and is provided for comparison.

| Example | Average Debind Shrinkage (%) | Average Sintering Shrinkage (%) | Total Shrinkage (%) |
|---|---|---|---|
| 1 | 2.70 | 1.37 | 4.07 |
| 2 | 2.17 | 0.49 | 2.66 |
| 3 | 3.35 | 0.04 | 3.39 |
| 4 | 2.98 | 0.12 | 3.10 |
| 5 | 3.14 | 0.35 | 3.49 |
| 6 | 2.52 | 0.18 | 2.70 |
| 7 | 3.18 | 0.39 | 3.57 |

Subsequently, the bars were completely fired (sintered) on a porous alumina plate up to 1600° C. with a 3 hour soak (i.e., holding temperature constant at 1600° C. for 3 hours) to further sinter the alumina and/or react the binder-derived silica with the alumina to form aluminosilicate. The shrinkage measured during the complete firing step (e.g., up to 1600° C.) is referred to as the sintering shrinkage. As indicated in Table 2, the average sintering shrinkage of the organic resins during sintering is substantially less than the sintering shrinkage of Example 1, which does not include a hybrid binder of the present technique. For example, embodiments of the present technique, represented by Examples 2-7 in Table 2, demonstrate a sintering shrinkage that is more than 50% lower, more than 75% lower, more than 90% lower, more than 95% lower, or more than 97% lower than the sintering shrinkage of the organic resin that did not include the disclosed hybrid binder, represented by Example 1 in Table 2. As indicated in Table 2, in certain embodiments, the total shrinkage of the ceramic part across the partial firing and sintering steps may be less than approximately 4%, less than approximately 3%, or less than approximately 2.75%. In certain embodiments, it may be appreciated that the lower sintering shrinkage may be attributed to the reaction between the hybrid binder-derived silica and the alumina particles to form aluminosilicate, which reduces alumina densification and, thereby, reduces sintering shrinkage.

Examples 8-11

Examples 8-11 are examples of model resin blends lacking ceramic particles that were manufactured, partially fired (i.e., up to 300° C.), and sintered (i.e., up to 800° C.), and the weight loss monitored via thermogravimetric analysis (TGA). While these examples lack the ceramic particles of the actual ceramic product, Examples 8-11 serve as models of the composition and nature of embodiments of the disclosed hybrid binder throughout the manufacturing process. It may be appreciated that Example 8 is an example of a reactive siloxane that exclusively copolymerizes and is miscible with (e.g., soluble in) the organic resin throughout curing. In contrast, Examples 9-11 are examples of reactive siloxanes that extensively homopolymerize and, therefore, the reactive siloxanes are miscible with (e.g., soluble in) the organic resins prior to curing, but separate into separate phases during the curing process.

Example 8

1.60 g of a blend containing 2 g of trimethylolpropane propoxylate triacrylate, 2 g tetravinyltetramethylcyclotetrasiloxane, 2 g of tricyclodecane dimethanol diacrylate, 1.5 g of diurethane dimethacrylate, and 0.2 g of phenyl bis(2,4,6-trimethylbenzoyl) phosphine oxide was combined with 0.40 g of trimethylolpropane tris(3-mercaptoproprionate). A small portion of this blend was UV cured and analyzed by TGA in air. The weight loss up to 300° C. was approximately 1.5% and the char yield after heating to 800° C. was approximately 11.4%.

Example 9

2.0 g of Methacrylated Silicone Resin B (described above), was combined with 6.5 g of 3,4-epoxycyclohexylmethyl 3,4-epoxycyclohexanecarboxylate, 1.5 g 3-ethyl-3-oxetanemethanol, 0.40 g (p-isopropylphenyl) (p-methylphenyl)iodonium tetrakis(pentafluorophenyl) borate, 0.10 g 4-benzoyl-4'methyl-diphenyl sulfide and 0.15 g 1-hydroxycyclohexyl phenyl ketone. A small sample of this blend was UV cured and then TGA analysis was conducted as described. The weight loss up to 300° C. was approximately 25.6% due to the thermal decomposition of the epoxy at this temperature. The char yield at 800° C. was approximately 10.3%.

Example 10

2.0 g of Silicone Resin SR355 (Momentive Performance Materials) was combined with 6.5 g of 3,4-epoxycyclohexylmethyl 3,4-epoxycyclohexanecarboxylate, 1.5 g 3-ethyl-3-oxetanemethanol (TCI), 0.40 g (p-isopropylphenyl)(p-methylphenyl)iodonium tetrakis(pentafluorophenyl) borate (Gelest), and 0.10 g 4-benzoyl-4'methyldiphenyl sulfide (TCI). A small sample of this blend was UV cured and then TGA analysis was conducted as described. The weight loss up to 300° C. was approximately 25.6% due to the fact the thermal decomposition of the epoxy had begun by this temperature. The char yield at 800° C. was approximately 12.6%.

Example 11

2.0 g of Methacrylated Silicone Resin B, described above, was combined with 6.5 g of 3,4-epoxycyclohexylmethyl 3,4-epoxycyclohexanecarboxylate, 1.5 g cyclohexanedimethanol divinyl ether, 0.4 g (p-isopropylphenyl) (p-methylphenyl)iodonium tetrakis(pentafluorophenyl) borate, 0.10 g 4-benzoyl-4'-methyl-diphenyl sulfide and 0.15 g 1-hydroxycyclohexyl phenyl ketone. A small sample of this blend was UV cured and then TGA analysis was conducted as described. The weight loss up to 300° C. was approximately 26% due to the thermal decomposition of the epoxy at this temperature. The char yield at 800° C. was approximately 14%.

Technical effects of the invention include light-curable ceramic slurry formulations having hybrid binders that improve the handling strength of the brown ceramic part. The disclosed hybrid binder that includes a reactive siloxane (e.g., a short, cyclic siloxane, or a silicone polymer) component that is capable of polymerizing (e.g., copolymerizing, homopolymerizing) along with an organic resin component. While the organic resin portion of the hybrid binder decomposes and volatilizes during partial firing of a green ceramic part, the reactive siloxane portion is converted to silica that is disposed about (e.g., between, around) the ceramic particles to enhance the handling strength of the brown ceramic part relative to similar parts made with non-hybrid binders (e.g., containing organic resin alone). The amount of silica formed by the disclosed hybrid binders is unexpectedly high, enabling char yields that can be greater than approximately 80% of the theoretical maximum char yield for a given reactive siloxane. Further, for ceramic parts made using alumina, present embodiments enable reaction bonding between the hybrid-binder generated silica and the alumina particles to form silicates (e.g., aluminosilicates) further increases the strength and reduces the shrinkage of the final ceramic part.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A light-curable ceramic slurry, comprising:
a hybrid binder, comprising:
an organic resin component; and
a multi-functional reactive siloxane component that is miscible with the organic resin component;
a photoinitiator having a corresponding photoactivation wavelength range; and
ceramic particles, wherein the ceramic slurry is cured via exposure to light in the photoactivation wavelength range of the photoinitiator such that both the organic resin component and the multi-functional reactive siloxane component of the hybrid binder polymerize.

2. The ceramic slurry of claim 1, wherein the multi-functional reactive siloxane component and the organic resin component each homopolymerize to form interpenetrating polymer networks when cured.

3. The ceramic slurry of claim 1, wherein the multi-functional reactive siloxane component comprises more than two functional groups that polymerize when cured.

4. The ceramic slurry of claim 1, wherein the multi-functional reactive siloxane component remains substantially miscible with the organic resin component of the hybrid binder throughout curing, and wherein multi-functional reactive siloxane component exclusively copolymerizes with the organic resin component of the hybrid binder when cured.

5. The ceramic slurry of claim 4, wherein the multi-functional reactive siloxane component comprises a cyclic siloxane having between 3 and 8 siloxane units.

6. The ceramic slurry of claim 5, wherein the cyclic siloxane is tetravinyltetramethyl cyclotetrasiloxane ($D_4^{vi}$).

7. The ceramic slurry of claim 1, wherein the organic resin component comprises an acrylate or a thiol, and wherein the slurry is configured to undergo free radical curing upon exposure to the light.

8. The ceramic slurry of claim 1, wherein the acrylate comprises trimethylolpropane ethoxylate triacrylate, tricyclodecane dimethanol diacrylate, diurethane dimethacrylate, trimethylolpropane propoxylate triacrylate, or poly(propyleneglycol) dimethacrylate, or a combination thereof, or wherein the thiol comprises trimethylolpropane tris(3-mercaptoproprionate).

9. The ceramic slurry of claim 1, wherein the organic resin component comprises an epoxy or an oxetane configured to undergo cationic curing upon exposure to the light, and wherein the epoxy or oxetane comprises 3,4-epoxycyclohexylmethyl 3,4-epoxycyclohexanecarboxylate, 3-ethyl-3-oxetanemethanol, or a combination thereof.

10. The ceramic slurry of claim 1, wherein the organic resin component comprises a vinyl ether, and wherein the vinyl ether comprises cyclohexanedimethanol divinyl ether.

11. The ceramic slurry of claim 1, wherein the weight ratio of the organic resin component to the multi-functional reactive siloxane component in the hybrid binder is between approximately 2:1 and approximately 5:1.

12. The ceramic slurry of claim 1, wherein the photoactivation wavelength range is between approximately 250 nm and approximately 500 nm.

13. The ceramic slurry of claim 1, wherein the ceramic particles comprise silica, zircon, or alumina particles.

14. The ceramic slurry of claim 1, wherein the slurry is free from solvents.

15. The ceramic slurry of claim 1, wherein the hybrid binder functions as a dispersant in the slurry and the slurry is free from other dispersants.

16. The ceramic slurry of claim 1, wherein the ceramic slurry is configured for use in a stereolithography system.

17. A method of manufacturing, comprising:
forming a slurry having ceramic particles and a hybrid binder, wherein the hybrid binder comprises an organic resin component and a multi-functional reactive siloxane component that is miscible with the organic resin component;

curing a portion of slurry by exposing the portion to light to cause the organic resin component and the multi-functional reactive siloxane component to both polymerize to form a portion of a green ceramic part; and partially firing the green ceramic part to form a brown ceramic part, wherein, during partial firing, the multi-functional reactive siloxane component of the hybrid binder is substantially converted to silica disposed about the ceramic particles.

18. The method of claim 17, wherein the slurry is free of solvent.

19. The method of claim 17, wherein the multi-functional reactive siloxane component and the organic resin component independently cure and homopolymerize to form interpenetrating polymer networks during curing.

20. The method of claim 17, wherein the multi-functional reactive siloxane remains substantially miscible with the organic resin component as the multi-functional reactive siloxane component and the organic resin component exclusively copolymerize during curing.

21. The method of claim 17, comprising depositing a layer of the slurry onto a surface using a three-dimensional (3D) printer, wherein curing comprises selectively exposing the portion of the layer of the slurry to light using the 3D printer to form the green ceramic part.

22. The method of claim 17, wherein partially firing comprises heating the green ceramic part to a temperature between approximately 500° C. and approximately 1200° C.

23. The method of claim 17, wherein partially firing comprises greater than approximately 70% of the siloxane units of the multi-functional reactive siloxane component being converted into the silica about the ceramic particles.

24. The method of claim 23, wherein partially firing comprises greater than approximately 80% of the siloxane units of the multi-functional reactive siloxane component being converted into the silica about the ceramic particles.

25. The method of claim 17, sintering the brown ceramic part at or above a sintering temperature of the ceramic particles to form a ceramic part.

26. The method of claim 25, wherein sintering comprising heating the brown ceramic part to a sufficient temperature to promote reaction bonding that converts the silica into silicates that bond with the ceramic particles.

27. The method of claim 25, wherein an average total shrinkage from partial firing and sintering of the ceramic part is less than approximately 4%.

28. The method of claim 25, wherein the average total shrinkage is less than approximately 3%.

* * * * *